US010890984B2

(12) United States Patent
Chou

(10) Patent No.: US 10,890,984 B2
(45) Date of Patent: Jan. 12, 2021

(54) COMPUTER INPUT APPARATUS, POINTING DEVICE AND SETTING METHOD THEREOF

(71) Applicant: HADES-GAMING CORP., New Taipei (TW)

(72) Inventor: Hung-Jen Chou, New Taipei (TW)

(73) Assignee: HADES-GAMING CORP., New Taipei (TW)

( * ) Notice: Subject to any disclaimer, the term of this patent is extended or adjusted under 35 U.S.C. 154(b) by 93 days.

(21) Appl. No.: 15/484,808

(22) Filed: Apr. 11, 2017

(65) Prior Publication Data
US 2018/0292913 A1     Oct. 11, 2018

(51) Int. Cl.
G06F 3/03        (2006.01)
G06F 3/0354      (2013.01)
G06F 3/039       (2013.01)

(52) U.S. Cl.
CPC ......... G06F 3/0317 (2013.01); G06F 3/0395 (2013.01); G06F 3/03543 (2013.01)

(58) Field of Classification Search
CPC ... G06F 3/0317; G06F 3/03543; G06F 3/0395
See application file for complete search history.

(56) References Cited

U.S. PATENT DOCUMENTS

| | | | | |
|---|---|---|---|---|
| 7,175,310 B1* | 2/2007 | Cotterell | ............... | G06F 3/0395 362/253 |
| 2004/0239615 A1* | 12/2004 | Firebaugh | ............ | G06F 3/0395 345/156 |
| 2008/0252601 A1* | 10/2008 | Boys | ..................... | G06F 3/0395 345/163 |
| 2008/0297478 A1* | 12/2008 | Hotelling | ................ | G06F 21/32 345/163 |
| 2010/0164388 A1* | 7/2010 | Chen | .................. | H05B 33/0869 315/151 |
| 2011/0134027 A1* | 6/2011 | Tsao | ........................ | G06F 3/038 345/156 |
| 2013/0058129 A1* | 3/2013 | Limber | ................... | G06F 1/325 362/605 |

\* cited by examiner

*Primary Examiner* — LaTanya Bibbins
(74) *Attorney, Agent, or Firm* — Li & Cai Intellectual Property (USA) Office

(57) ABSTRACT

Disclosed are a computer input apparatus including a mouse pad and a pointing device, and a setting method. The pointing device includes a displacement sensing part, a light sensing part, a memory and a processing part. The displacement sensing part detects a displacement of the pointing device. The memory stores at least a set of predetermined parameters. The processing part is connected to the displacement sensing part, the light sensing part and the memory. The mouse pad includes an indicating unit. When the pointing device is operated on the mouse pad, the light sensing part detects a light mode of the indicating unit, and the processing part selects and sets one of the predetermined parameters as a working parameter of the pointing device according to the detected light mode of the indicating unit.

8 Claims, 4 Drawing Sheets

COMPUTER INPUT APPARATUS, POINTING DEVICE AND SETTING METHOD THEREOF

BACKGROUND OF THE INVENTION

1. Field of the Invention

The present disclosure relates to an input apparatus; in particular, to a computer input apparatus, a pointing device and a setting method thereof for controlling a computer cursor.

2. Description of Related Art

The operation features of a mouse are important and directly affect the convenience of a user when using a computer. For example, the sensitivity of a mouse directly affects the moving speed of a cursor shown on the screen. According to the user's habits or different computer programs that are executed by the computer, the mouse may need to work in different modes to provide different operation features. The operation features of the mouse can be adjusted by setting the working parameter of the mouse through the computer. However, not only are the parameter settings complex and time-consuming to adjust, but need to be readjusted each time the mouse is linked to a different computer (i.e., a different host device).

SUMMARY OF THE INVENTION

A computer input apparatus, a pointing device and a setting method thereof are provided by the present disclosure. By using this computer input apparatus, the pointing device and the setting method thereof, it is easy and simple to set the working parameter of the pointing device.

This computer input apparatus provided by the present disclosure includes a mouse pad and a pointing device. The mouse pad includes an indicating unit. The pointing device includes a displacement sensing part, a light sensing part, a memory and a processing part. The displacement sensing part detects a displacement of the pointing device. The memory stores at least a set of predetermined parameters. The processing part is connected to the displacement sensing part, the light sensing part and the memory. When the pointing device is operated on the mouse pad, the light sensing part detects a light mode of the indicating unit, and the processing part selects and sets one of the predetermined parameters as a working parameter of the pointing device according to the detected light mode of the indicating unit.

This pointing device provided by the present disclosure includes a displacement sensing part, a light sensing part, a memory and a processing part. The displacement sensing part detects a displacement of the pointing device. The memory stores at least one set of predetermined parameters. The processing part is connected to the displacement sensing part, the light sensing part and the memory. When the pointing device is operated on a mouse pad, the light sensing part detects a light mode of an indicating unit of the mouse pad, and the processing part selects and sets one of the predetermined parameters as a working parameter of the pointing device according to the detected light mode of the indicating unit of the mouse pad.

The setting method provided by the present disclosure is for setting a working parameter of a pointing device when the pointing device is operated on the mouse pad. This setting method includes: through a light sensing part of the pointing device, detecting a light mode of an indicating unit of the mouse pad when the indicating unit of the mouse pad is lighting; and selecting and setting one of predetermined parameters as a working parameter of the pointing device according to the detected light mode of the indicating unit of the mouse pad. In this setting method, the predetermined parameters are stored in a memory of the pointing device.

To sum up, by using the computer input apparatus, the pointing device and the setting method thereof provided by the present disclosure, the pointing device can detect a light mode of the mouse pad and directly set a working parameter thereof without a host device. Thus, it is quick and easy for a user to set the working parameter of a pointing device without having to learn any difficult or complex operation process.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

A computer input apparatus is provided by the present disclosure. The computer input apparatus includes a pointing device and a mouse pad. The mouse pad is configured for a user to operate the pointing device upon its surface, and accordingly, the movement of a computer cursor shown on the screen can be controlled. In addition, the mouse pad emits a light as an indicator. The pointing device can detect the light mode of the mouse pad, and then set its working parameter according to the detected light mode of the mouse pad. In other words, in the present disclosure, the pointing device can directly set its working parameter according to the detected light mode of the mouse pad without any host device involved. Moreover, the working parameter of the pointing device can be defined as a sensing resolution of a mouse, a USB report rate of a mouse, a frame rate of a mouse or a shortcut command, and it is not limited thereto.

[One Embodiment of the Computer Input Apparatus]

Figure 1:
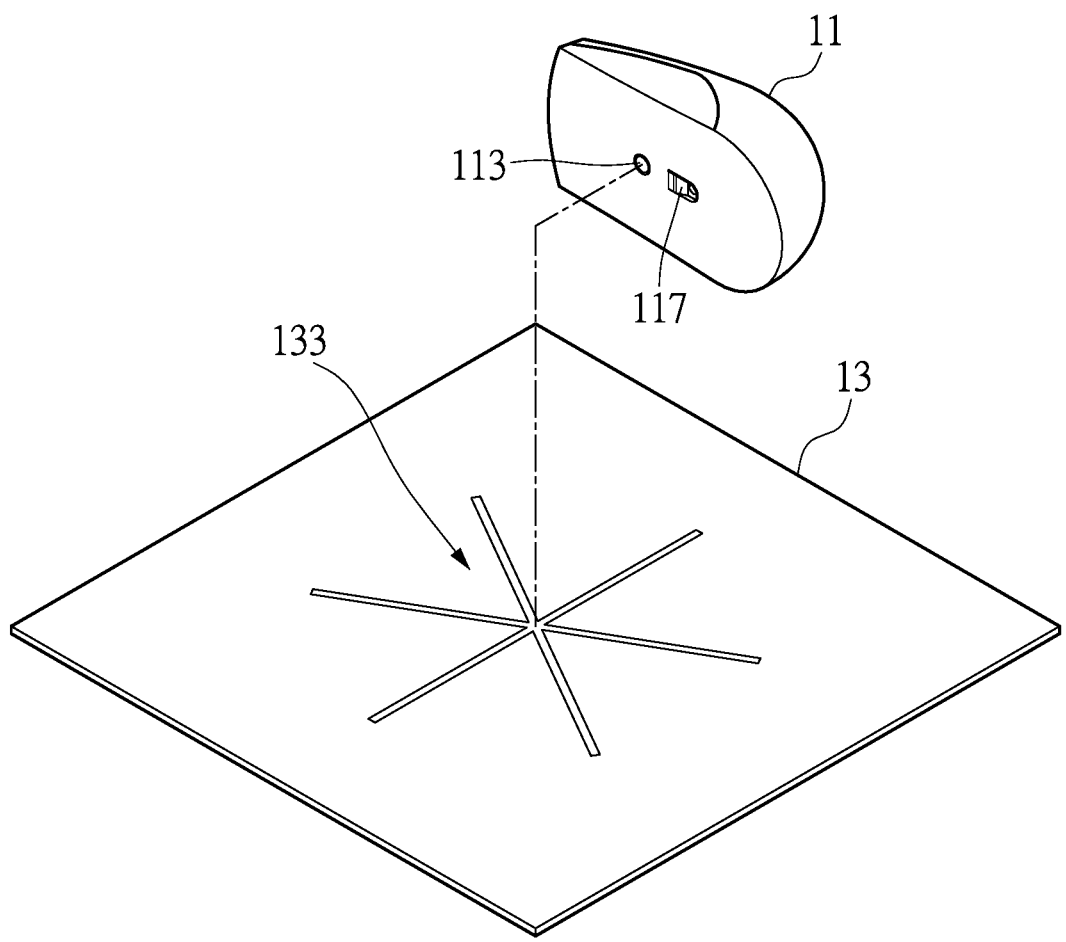
FIG. 1 shows a schematic diagram of a computer input apparatus of one embodiment of the present disclosure.

Referring to FIG. 1, a schematic diagram of a computer input apparatus of one embodiment of the present disclosure is shown. The computer input apparatus 1 provided by this embodiment includes a pointing device 11 and a mouse pad 13. The mouse pad 13 has an indicating unit 133 that can light up in different light modes. The indicating unit 133 can be controlled to work in different light modes with lights having different colors or flashing patterns. In one example, the indicating unit 133 can be light bars configured on the surface of the mouse pad 13. The shape of the light bars, the number of the light bars and the position where the light bars are configured can be freely designed, as long as the light mode of the indicating unit 133 can be detected by the pointing device 11. In another example, the indicating unit 133 can be a light panel, but is not limited thereto.

The pointing device 11 includes a displacement sensing part 117 and a light sensing part 113. The displacement sensing part 117 detects a displacement of the pointing device 11, and accordingly generates a cursor signal that controls a movement of a computer cursor. When the pointing device 11 is operated on the mouse pad 13, the light sensing part 113 of the pointing device 11 detects a light mode of the indicating unit 133 of the mouse pad 13. After that, the pointing device 11 adjusts its working parameter according to the detected light mode of the indicating unit 133 of the mouse pad 13.

The light sensing part 113 can be configured at the bottom of the pointing device 11. In other words, the light sensing part 113 and the displacement sensing part 117 are configured at the same side of the pointing device 11. The position that light sensing part 113 is disposed is not restricted as long as the light mode of the indicating unit 133 can be detected by the light sensing part 113. For example, the light sensing part 113 can detect whether the light emitted by the indicating unit 133 is one of the preset colors. In the affirmative, the pointing device 11 selects and sets a predetermined parameter corresponding to the preset color as its working parameter. Then, the pointing device 11 works according to the set working parameter. Likewise, the light sensing part 113 can detect whether the flashing frequency of the light generated by the indicating unit 133 is identical to one of the preset flashing frequencies. In the affirmative, the pointing device 11 selects and sets a predetermined parameter corresponding to the preset flashing frequency as its working parameter. Then, the pointing device 11 works according to the set working parameter.

To set the working parameter of the pointing device 11, the indicating unit 133 of the mouse pad 13 can firstly be controlled to work in a light mode corresponding to a desired working parameter. Then, when the indicating unit 133 of the mouse pad 13 lights up, a user can put the pointing device 11 on the mouse pad 13 and slide the pointing device 11 around thereon, such that the light sensing part 113 of the pointing device 11 can detect the light mode of the indicating unit 133 of the mouse pad 13. Finally, the desired working parameter of the pointing device 11 can be set accordingly.

It is worth mentioning that, a light mode of the indicating unit 133 can be controlled to work only in a predetermined time period. Thus, the pointing device 11 can set its working parameter only during this period. However, there is no restriction that a light mode of the indicating unit 133 must be controlled to work only in a predetermined time period. In this embodiment, the pointing device 11 can control the timing to turn on or turn off the light sensing part 113, but the pointing device 11 can set its working parameter only when the light sensing part 113 is turned on.

[Another Embodiment of the Computer Input Apparatus]

Figure 2:
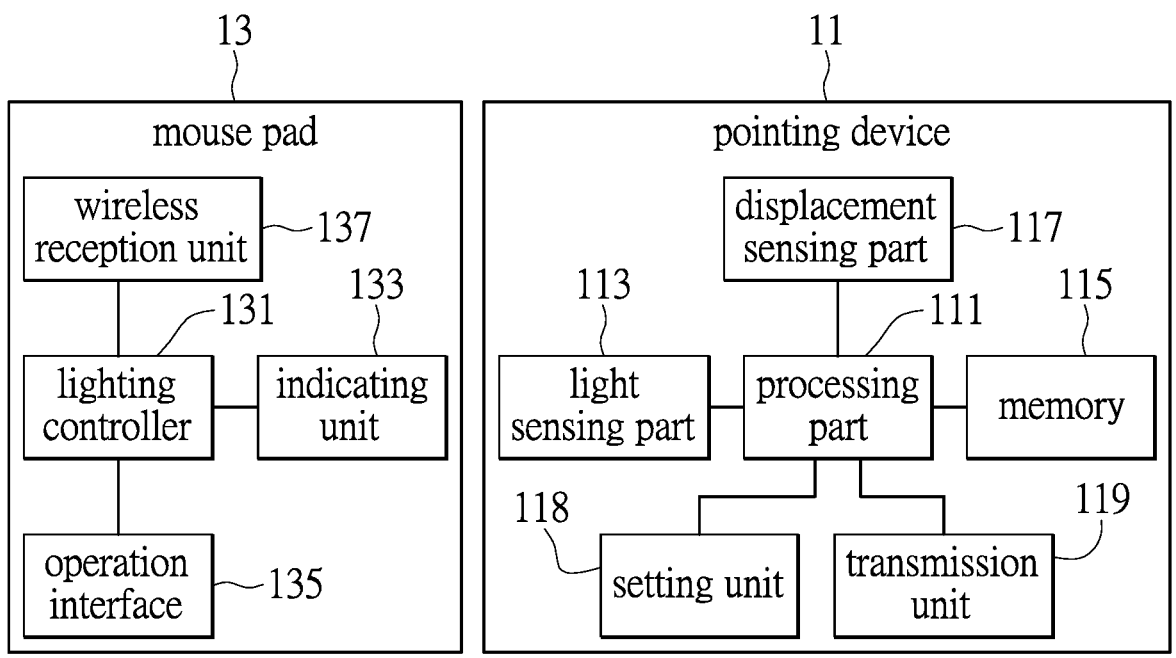
FIG. 2 shows a block diagram of a computer input apparatus of one embodiment of the present disclosure.

Referring to FIG. 2, a block diagram of a computer input apparatus of one embodiment of the present disclosure is shown. The computer input apparatus 1 in this embodiment includes a pointing device 11 and a mouse pad 13. The pointing device 11 includes a processing part 111, a light sensing part 113, a memory 115, a displacement sensing part 117, a setting unit 118 and a transmission unit 119. The processing part 111 is connected to the light sensing part 113, the memory 115, the displacement sensing part 117, the setting unit 118 and the transmission unit 119, respectively. The displacement sensing part 117 is controlled by the processing part 111 to detect a displacement of the pointing device 11. Then, the processing part 111 can generate a cursor signal according to the detected displacement of the pointing device 11. The light sensing part 113 is controlled by the processing part 111 to detect surrounding lights. The memory 115 stores one or more sets of predetermined parameters. These predetermined parameters can be selected and used as the working parameter of the pointing device 11. When a user operates the setting unit 118, the setting unit 118 is controlled by the processing part 111 to generate a setting signal for setting the working parameter of the pointing device 11. The transmission unit 119 can be controlled by the processing part 111 to transmit the cursor signal generated by the displacement sensing part 117 to a host device, or the transmission unit 119 can be controlled by the processing part 111 to wirelessly receive a setting signal from a mobile device for the processing part 111 to set the working parameter of the pointing device 11. The mobile device can be, for example, a mobile phone, a tablet or a PDA.

The processing part 111 can be a processor or a controller. The displacement sensing part 117 can be an optical displacement sensing circuit or a roller displacement sensing circuit. Those skilled in the art should be familiar with the workings of a processor, controller, optical displacement sensing circuit or roller displacement sensing circuit, and thus such information are omitted herein. The light sensing part can be a light sensor that can detect a light source, especially a light sensor that can detect the color of the light from a light source or the flashing frequency of the light from a light source. The memory 115 can be a non-volatile memory to store one or more sets of predetermined parameters, and each predetermined parameter corresponds to a preset light mode. The setting unit 118 can be an operation interface for a user to use, such as keys or a DIP switch. If the operation interface has keys, a setting signal can be generated and transmitted to the processing part 111 by pressing a single key or multiple keys. When the key or the keys are released, the setting signal is not generated any more. If the operation interface has a DIP switch, it can be determined whether to generate and transmit a setting signal to the processing part 111 by turning on/off switches of the DIP switch in different ways. For example, when the switches of the DIP switch are turned on/off according to a first position, it is determined not to generate and transmit a setting signal to the processing part 111, but when the switches of the DIP switch are turned on/off according to a second position, it is determined to generate and transmit a setting signal to the processing part 111. The transmission unit 119 can be a wired transmission circuit or a wireless transmission circuit.

The setting signal of the pointing device 11 can be directly generated by the setting unit 118, or the pointing device 11 can wirelessly receive a setting signal from a mobile device through the transmission unit 119, but is not limited thereto. In addition, the pointing device 11 can choose one of the above two ways as a major source of the setting signal. Moreover, in one embodiment, instead of generating a setting signal, the pointing device 11 can determine whether to set its working parameter according to whether the indicating unit 133 of the mouse pad 13 is lighting.

As shown in FIG. 2, the mouse pad 13 includes a light controller 131, an indicating unit 133, an operation interface 135 and a wireless reception unit 137. The light controller 131 is connected to the indicating unit 133, the operation interface 135 and the wireless reception unit 137, respectively. The indicating unit 133 can be, for example, the light bars or a light panel as described above. The operation interface 135 is controlled by the light controller 131 to generate a switching signal according to a user's operation.

According to this switching signal, the light controller 131 controls the indicating unit 133 to work in different light modes having different light colors or different flashing frequencies.

In practice, the light controller 131 can be a processor or a controller. The operation interface 135 can be a single key or multiple keys. If the operation interface 135 is a single key, each sequential push upon the single key corresponds to one of light modes. In different light modes, the indicating unit 133 emits lights having different lighting colors, emits lights having different frequencies of flashing, or stops emitting light. For example, the first push on the single key makes the light controller 131 work in one light mode in which the light emitted by the light controller 131 is red, and the second push on the single key makes the light controller 131 work in another light mode in which the light emitted by the light controller 131 is green. If the operation interface 135 is multiple keys, each key is used for controlling the indicating unit 133 to work in different light modes having different lighting colors or different flashing frequencies. One of these keys can be used for controlling the indicating unit 133 to stop emitting light.

Moreover, the operation interface 135 can also be a DIP switch. Different switching signals are generated to the light controller 131 when switches of the DIP switch are turned on/off in different ways. For example, when the switches of the DIP switch are turned on/off according to a first position, a first switching signal is generated, the light controller 131 controls the indicating unit 131 to emit a light having a first color or having a first flashing frequency according to this first switching signal, but when the switches of the DIP switch are turned on/off according to a second position, a second switching signal is generated, the light controller 131 controls the indicating unit 131 to emit a light having a second color or having a second flashing frequency according to this second switching signal. In addition, when the switches of the DIP switch are turned on/off according to a third position, a third switching signal is generated, and the light controller 131 controls the indicating unit 133 to stop emitting light. However, the above example is only for illustration and not for restricting the present disclosure.

The wireless reception unit 137 wirelessly receives a switching signal from a mobile phone. According to this switching signal, the light controller 131 may control the indicating unit 133 to emit a light having a specific color or having a specific flashing frequency. Even more, the light controller 131 may control the indicating unit 133 to stop emitting light according to the switching signal.

Thus, the switching signal of the mouse pad 13 can be directly generated by the operation interface 135, or can be a switching signal provided by a mobile phone and received by the wireless reception unit 137. In addition, the mouse pad 13 can choose one of the above two ways as a major source of the switching signal. It should be noted that, it is not restricted that the switching signal needs to be generated in one of the above two ways.

In short, in this embodiment, the light controller 131 of the mouse pad 13 controls the indicating unit 133 to work in different light modes according to different switching signals. When the light sensing part 113 of the pointing device 11 is turned on to detect the light mode of the indicating unit 133, the processing part 111 determines whether the light mode of the indicating unit 133 currently detected by the light sensing part 113 is identical with one of preset light modes stored in the memory 115. If there is one preset light mode identical with the light mode of the indicating unit 133 currently detected by the light sensing part 113, the processing part 111 selects and sets the predetermined parameter corresponding to this preset light mode as the working parameter of the pointing device 11.

In this manner, the working parameter of the pointing device 11 can be easily set, without using a host device, according to the light mode of the mouse pad 13.

[One Embodiment of the Setting Method of the Pointing Device]

Figure 3:
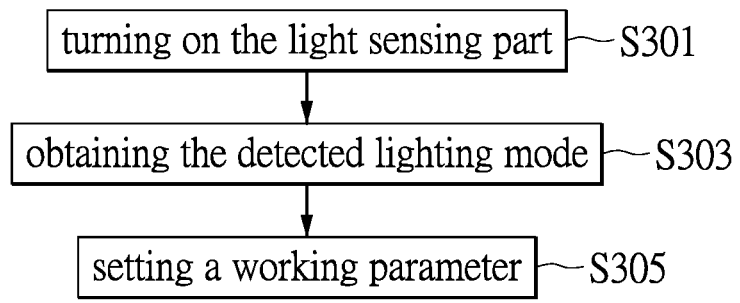
FIG. 3 is a flow chart showing how a pointing device is set in one embodiment of the present disclosure.

Referring to FIG. 3, a flow chart showing how a pointing device is set in one embodiment of the present disclosure is shown. In the setting method of the pointing device 11 provided by this embodiment, the working parameter of the pointing device 11 is set according to the light mode of the mouse pad 13. Steps shown in FIG. 3 can be executed by the computer input apparatus shown in FIG. 1 and FIG. 2.

In step S301, the pointing device 11 turns on the light sensing part 113. The light sensing part 113 can be turned on as soon as the pointing device 11 is turned on. Alternatively, the light sensing part 113 can be turned on only when a setting signal generated after the pointing device 11 is turned on.

In step S303, the pointing device 11 detects the light mode of the mouse pad 13 through the light sensing part 113 when the pointing device 11 is operated on the mouse pad 13.

In step S305, when the light mode of the indicating unit 133 of the mouse pad 13 is detected by the light sensing part 113 and this detected light mode is identical with one of preset light modes, a predetermined parameter corresponding to this preset light mode is set as the working parameter of the pointing device 11. For example, a first predetermined parameter corresponds to one preset light mode in which the emitted light is yellow. In this example, when the indicating unit 133 of the mouse pad 13 is working in a light mode in which the indicating unit 133 emits a yellow light, the light sensing part 113 of the pointing device 11 detects the yellow light emitted by the indicating unit 133 of the mouse pad 13, and accordingly the first predetermined parameter is set as the working parameter of the pointing device 11. Likewise, for another example, a second predetermined parameter corresponds to one preset light mode in which the emitted light is green. In this example, when the indicating unit 133 of the mouse pad 13 is working in a light mode in which the indicating unit 133 emits a green light, the light sensing part 113 of the pointing device 11 detects the green light emitted by the indicating unit 133 of the mouse pad 13, and accordingly the second predetermined parameter is set as the working parameter of the pointing device 11.

[Another Embodiment of the Setting Method of the Pointing Device]

Figure 4:
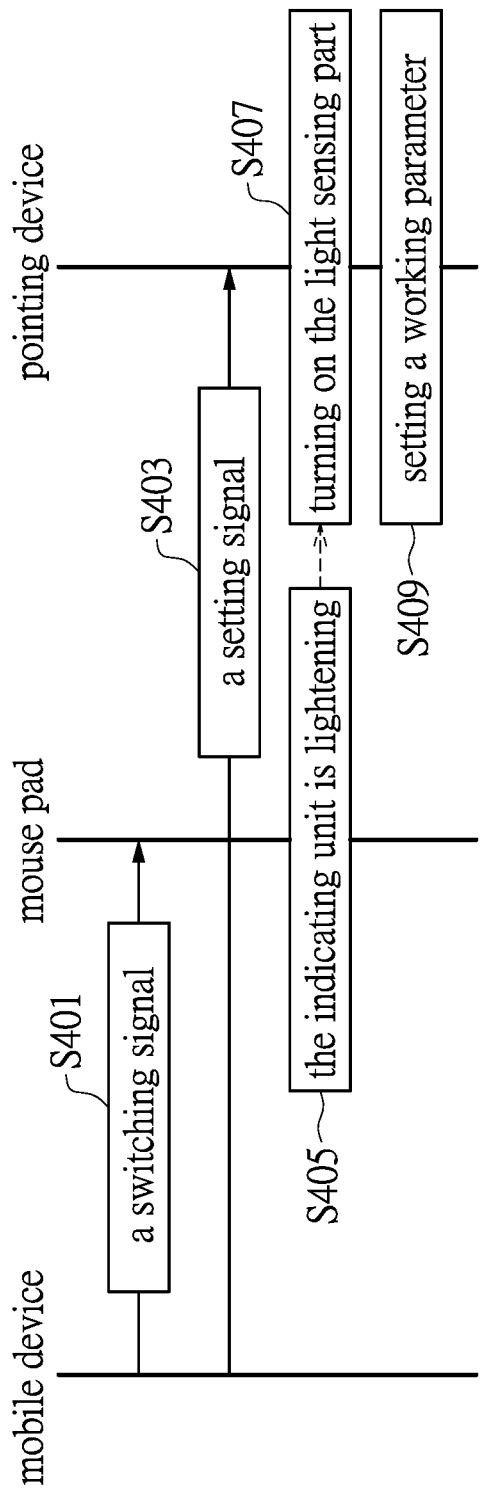
FIG. 4 is a flow chart showing how a computer input apparatus is controlled in one embodiment of the present disclosure.

Referring to FIG. 4, a flow chart showing how a computer input apparatus is controlled in one embodiment of the present disclosure is shown. In the setting method of the pointing device 11 provided by this embodiment, the working parameter of the pointing device 11 is set according to the light mode of the mouse pad 13. Steps shown in FIG. 4 can be executed by the computer input apparatus shown in FIG. 1 and FIG. 2.

In step S401, a user operates a mobile device to generate a switching signal and to provide this switching signal to the mouse pad 13. Specifically, the mobile device has a user interface, and the user can choose to generate different switching signals by using the user interface according to a desired working parameter for the pointing device 11.

Is step S403, the user operates the mobile device to generate a setting signal and to provide this setting signal to the pointing device 11.

In step S405, when the mouse pad 13 receives the switching signal, the mouse pad 13 controls the indicating unit 133 to work in a light mode corresponding to this switching signal.

In step S407, when the pointing device 11 receives the setting signal, the pointing device 11 turns on the light sensing part 113 according to this setting signal.

In step S409, when the light mode of the indicating unit 133 is detected by the pointing device 11 and when the pointing device 11 determines that the detected light mode is identical with one of preset light modes, the pointing device 11 sets a predetermined parameter corresponding to this preset light mode as its working parameter. Then, the pointing device 11 works according to the set working parameter.

It is worth mentioning that, in step S403, the pointing device 11 can directly receive a setting signal generated by the setting unit 118.

[Still Another Embodiment of the Setting Method of the Pointing Device]

Figure 5:
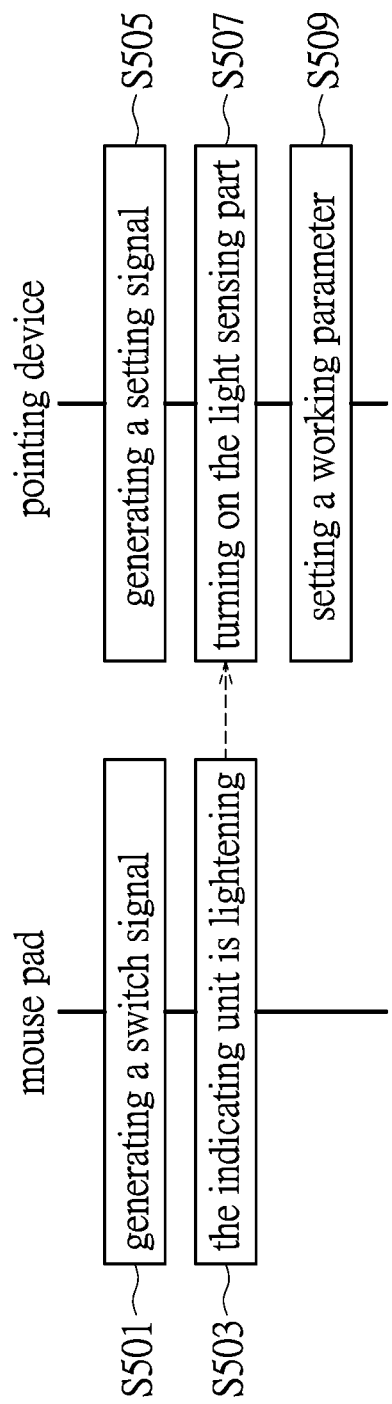
FIG. 5 is a flow chart showing how a computer input apparatus is controlled in another embodiment of the present disclosure.

Referring to FIG. 5, a flow chart showing how a computer input apparatus is controlled in another embodiment of the present disclosure is shown. In the setting method of the pointing device 11 provided by this embodiment, the working parameter of the pointing device 11 is set according to the light mode of the mouse pad 13. Steps shown in FIG. 5 can be executed by the computer input apparatus shown in FIG. 1 and FIG. 2.

In step S501, a user operates an operation interface 135 of the mouse pad 13 to generate a switching signal. Details on how the operation interface 135 generates the switching signal are provided in the above description.

In step S503, when the mouse pad 13 receives the switching signal, the mouse pad 13 controls the indicating unit 133 to work in a light mode corresponding to this switching signal.

In step S505, when the pointing device 11 receives a setting signal generated by the setting unit 118 according to the user's operation, the pointing device 11 turns on the light sensing part 113 according to this setting signal. Details on how the setting unit 118 generates the setting signal are provided in the above description.

In step S509, when the light mode of the indicating unit 133 is detected by the pointing device 11 and when the pointing device 11 determines that the detected light mode is identical with one of preset light modes, the pointing device 11 sets a predetermined parameter corresponding to this preset light mode as its working parameter. Then, the pointing device 11 works according to the set working parameter.

It is worth mentioning that, in step S505, the pointing device 11 can wirelessly receive a setting signal from a mobile device through the transmission unit 119.

In the embodiments shown in FIG. 4 and FIG. 5, the pointing device 11 turns on the light sensing part 113 according to the setting signal. However, in other embodiments, when the pointing device 11 is turned on, the pointing device 11 can simultaneously turn on the light sensing part 113. After the working parameter of the pointing device 11 is set, the indicating unit 133 of the mouse pad 13 is controlled to stop emitting light so as to prevent the pointing device 11 from setting its working parameter again.

To sum up, by using the computer input apparatus, the pointing device and the setting method thereof provided by the present disclosure, the pointing device can directly detect a light mode of the mouse pad and accordingly can have its working parameter set without involving a host device. Thus, it is quick and easy for a user to set the working parameter of a pointing device without having to learn any difficult or complex operation process.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A computer input apparatus, comprising:
  a mouse pad, including an indicating unit, a light controller and a wireless reception unit; and
  a pointing device, including:
  a displacement sensing part, detecting a displacement of the pointing device;
  a light sensing part;
  a non-volatile memory, storing a set of predetermined parameters, wherein each of the predetermined parameters corresponds to a preset light mode; and
  a processing part, connected to the displacement sensing part, the light sensing part and the non-volatile memory;
  wherein the light controller controls the indicating unit working in different light modes having different light colors or different flashing frequencies or turning off the indicating unit according to a switching signal;
  wherein the wireless reception unit is connected to the light controller, and the light controller wirelessly receives the switching signal from a mobile device through the wireless reception unit;
  wherein the processing part of the pointing device wirelessly receives a setting signal from the mobile device and turns on the light sensing part according to the setting signal;
  wherein when the pointing device is operated on the mouse pad and the setting signal is received by the processing part and the light sensing part is turned on, the light sensing part detects the light mode of the indicating unit and the processing part selects and sets one of the predetermined parameters as a working parameter of the pointing device according to the detected light mode of the indicating unit,
  wherein when the light sensing part of the pointing device detects and determines that the light mode of the indicating unit is identical with one of the preset light modes, the processing part of the pointing device selects and sets the predetermined parameter corresponding to the preset light mode identical with the detected light mode as the working parameter of the pointing device; and wherein the working parameter is defined as one of a sensing resolution of a mouse, a USB report rate of a mouse, a frame rate of a mouse or a shortcut instruction.

2. The computer input apparatus according to claim 1, wherein the mouse pad has an operation interface, the operation interface is connected to the light controller, and the light controller generates the switching signal according to a user operation on the operation interface.

3. The computer input apparatus according to claim 1, wherein the indicating unit is a light bar or a light panel, and the light sensing part is a light sensor.

4. The computer input apparatus according to claim 1, wherein the pointing device further includes a setting unit, the setting unit is connected to the processing part, the setting unit is configured to be operated to generate the setting signal, and the setting unit is a key or a DIP switch.

5. A pointing device, comprising:
a displacement sensing part, detecting a displacement of the pointing device;
a light sensing part;
a non-volatile memory, storing one set of predetermined parameters, wherein each of the predetermined parameters corresponds to a preset light mode; and
a processing part, connected to the displacement sensing part, the light sensing part and the non-volatile memory;
wherein the processing part wirelessly receives a setting signal from a mobile device and turns on the light sensing part according to the setting signal;
wherein when the pointing device is operated on a mouse pad having a light controller and the setting signal is received by the processing part and the light sensing part is turned on, the light sensing part detects a light mode of an indicating unit of the mouse pad, and the processing part selects and sets one of the predetermined parameters as a working parameter of the pointing device according to the detected light mode of the indicating unit of the mouse pad,
wherein when the light sensing part of the pointing device detects and determines that the light mode of the indicating unit of the mouse pad is identical with one of the preset light modes, the processing part of the pointing device selects and sets the predetermined parameter corresponding to the preset light mode identical with the detected light mode of the indicating unit of the mouse pad as the working parameter; and wherein the working parameter is defined as one of a sensing resolution of a mouse, a USB report rate of a mouse, a frame rate of a mouse or a shortcut instruction;

wherein the light controller controls the indicating unit working in different light modes having different light colors or different flashing frequencies or turning off the indicating unit according to a switching signal.

6. The pointing device according to claim 5, wherein the light sensing part is a light sensor.

7. The pointing device according to claim 5, further comprising:
a setting unit, connected to the processing part, wherein the setting unit is configured to be operated for generating the setting signal, and the setting signal is a key or a DIP switch.

8. A setting method, for setting a working parameter of a pointing device when the pointing device is operated on a mouse pad having a light controller, comprising:
through a light sensing part of the pointing device, detecting a light mode of an indicating unit of the mouse pad when the indicating unit of the mouse pad is lighting; and
selecting and setting one of predetermined parameters as a working parameter of the pointing device according to the detected light mode of the indicating unit of the mouse pad, wherein the predetermined parameters are stored in a non-volatile memory of the pointing device,
wherein each of the predetermined parameters corresponds to a preset light mode, and when the light sensing part of the pointing device detects and determines that the light mode of the indicating unit of the mouse pad is identical with one of the preset light modes, the pointing device selects and sets the predetermined parameter corresponding to the preset light mode identical with the detected light mode as the working parameter; and
wherein the working parameter is defined as one of a sensing resolution of a mouse, a USB report rate of a mouse, a frame rate of a mouse and a shortcut instruction;
wherein the pointing device wirelessly receives a setting signal from a mobile device and turns on the light sensing part according to a setting signal;
wherein the mouse pad controls the indicating unit working in different light modes having different lighting colors or different flashing frequencies or turning off the indicating unit according to the switching signal;
wherein the mouse pad wirelessly receives the switching signal from the mobile device.

* * * * *